United States Patent
Guo et al.

(10) Patent No.: US 12,078,515 B2
(45) Date of Patent: Sep. 3, 2024

(54) LINEAR DISPLACEMENT ABSOLUTE POSITION ENCODER

(71) Applicant: MultiDimension Technology Co., Ltd., Zhangjiagang (CN)

(72) Inventors: Haiping Guo, Zhangjiagang (CN); Weifeng Shen, Zhangjiagang (CN); Songsheng Xue, Zhangjiagang (CN); Haochen Li, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 58 days.

(21) Appl. No.: 17/904,414

(22) PCT Filed: Feb. 9, 2021

(86) PCT No.: PCT/CN2021/076130
§ 371 (c)(1),
(2) Date: Aug. 17, 2022

(87) PCT Pub. No.: WO2021/164632
PCT Pub. Date: Aug. 26, 2021

(65) Prior Publication Data
US 2022/0404171 A1 Dec. 22, 2022

(30) Foreign Application Priority Data
Feb. 17, 2020 (CN) .......................... 202020177471.0

(51) Int. Cl.
*G01D 5/16* (2006.01)
*G01D 5/14* (2006.01)

(52) U.S. Cl.
CPC .............. *G01D 5/16* (2013.01); *G01D 5/142* (2013.01)

(58) Field of Classification Search
CPC ............ G01D 5/12; G01D 5/14; G01D 5/142; G01D 5/16; G01D 5/244; G01D 5/249;
(Continued)

(56) References Cited

U.S. PATENT DOCUMENTS

| 5,336,884 A | 8/1994 | Khoshnevisan et al. |
| 5,450,009 A * | 9/1995 | Murakami ............... G01V 3/08 324/207.21 |

(Continued)

FOREIGN PATENT DOCUMENTS

| CN | 102301205 A | 12/2011 |
| CN | 102322878 A | 1/2012 |

(Continued)

OTHER PUBLICATIONS

"International Application No. PCT/CN2021/076130, International Search Report and Written Opinion mailed May 13, 2021", (May 13, 2021), 11 pgs.

*Primary Examiner* — Huy Q Phan
*Assistant Examiner* — David B Frederiksen
(74) *Attorney, Agent, or Firm* — Schwegman Lundberg & Woessner, P.A.

(57) ABSTRACT

Disclosed is linear displacement absolute position encoder used for measuring displacement of a tested apparatus. The linear displacement absolute position encoder comprises a base, a magnetoresistive sensor array, an encoding strip, and a back magnet. The encoding strip is fixed on the base and extends in the direction of a rail of the tested apparatus. The encoding strip is a magnetic material block having recess and protrusion for identifying encoding information of different positions. The magnetoresistive sensor array is arranged between the encoding strip and the back magnet in a non-contact manner. The back magnet is used for generating a non-uniform magnetic field around the encoding strip so as to magnetize the encoding strip. The magnetoresistive (Continued)

sensor array is used for acquiring the position encoding information of the encoding strip by detecting magnetic field information of the encoding strip. The encoder is low cost and can monitor large distances.

16 Claims, 6 Drawing Sheets

(58) Field of Classification Search
CPC ...... G01D 5/2497; G01R 33/02; G01R 33/06; G01R 33/09–098
See application file for complete search history.

(56) References Cited

U.S. PATENT DOCUMENTS

| | | | |
|---|---|---|---|
| 8,878,526 B2 | 11/2014 | Dolsak | |
| 9,041,385 B2 | 5/2015 | Kirste et al. | |
| 10,066,966 B2 | 9/2018 | Hara et al. | |
| 2002/0093329 A1* | 7/2002 | Schroeder | G01D 5/147 324/207.21 |
| 2011/0267043 A1 | 11/2011 | Dolsak | |
| 2013/0200886 A1 | 8/2013 | Kirste et al. | |
| 2016/0334243 A1 | 11/2016 | Hara et al. | |
| 2017/0045380 A1* | 2/2017 | Ueda | G01D 5/2451 |
| 2017/0254670 A1* | 9/2017 | Lin | G01D 5/2452 |
| 2019/0101414 A1* | 4/2019 | Matsubara | H10N 50/10 |
| 2020/0116525 A1* | 4/2020 | Friedrich | G01D 5/145 |
| 2020/0141761 A1* | 5/2020 | Hsiao | G01D 5/142 |

FOREIGN PATENT DOCUMENTS

| | | |
|---|---|---|
| CN | 106104211 A | 11/2016 |
| CN | 208736432 U | 4/2019 |
| CN | 211346681 U | 8/2020 |
| EP | 2561319 B1 | 2/2014 |
| JP | 2004294362 A | 10/2004 |
| WO | WO-2021164632 A1 | 8/2021 |

* cited by examiner

LINEAR DISPLACEMENT ABSOLUTE POSITION ENCODER

PRIORITY CLAIM TO RELATED APPLICATIONS

This application is a U.S. national stage filing under 35 U.S.C. § 371 from International Application No. PCT/CN2021/076130, filed on 9 Feb. 2021, and published as WO2021/164632 on 26 Aug. 2021, which claims the benefit under 35 U.S.C. 119 to Chinese Application No. 202020177471.0, filed on 17 Feb. 2020, the benefit of priority of each of which is claimed herein, and which applications and publication are hereby incorporated herein by reference in their entirety.

TECHNICAL FIELD

Embodiments of the present disclosure relate to the field of magnetic sensors, and particularly relates to a linear displacement absolute position encoder.

BACKGROUND ART

Linear displacement sensors are widely used in position monitoring and measurement, such as displacement measurement in precision instruments, machine tool workbench position control, elevator position monitoring, etc.

Photoelectric sensors, capacitive coupling sensors, and magnetic grid sensors are usually used for detecting long-distance displacement measurement. Because of its high anti-pollution characteristics, the magnetic grid sensor is more suitable for use in harsh environments, such as elevators, open-air rails, etc.

However, at present, the detection distance of the magnetic grid displacement sensor is relatively short, and is usually within 10 meters. If the magnetic grid displacement sensor is applied to the long-distance displacement measurement, there will be a problem that the cost of the permanent magnet magnetic grid is high.

SUMMARY OF THE DISCLOSURE

The embodiments of the present disclosure aim to provide a linear displacement absolute position encoder, and the encoder is low in cost and can monitor large distances.

In order to achieve this object, the embodiments of the present disclosure adopt the following technical solution:
a linear displacement absolute position encoder, used for measuring displacement of a tested apparatus, the linear displacement absolute position encoder comprising a base, a magnetoresistive sensor array, an encoding strip, and a back magnet;
the encoding strip being fixed on the base and extending in the direction of a rail of the tested apparatus, and the encoding strip being a magnetic material block having recesses and protrusions for identifying encoding information of different positions;
the magnetoresistive sensor array being arranged between the encoding strip and the back magnet in a non-contact manner;
the back magnet being used for generating a non-uniform magnetic field around the encoding strip so as to magnetize the encoding strip; and
the magnetoresistive sensor array comprising magnetoresistive sensors in N rows and M columns, wherein N≥1, M≥1, and N and M are both positive integers, and the magnetoresistive sensor array being used for acquiring position encoding information of the encoding strip by detecting magnetic field information of the encoding strip.

Further, the encoding strip has P rows of encoding channels arranged in the direction of the rail of the tested apparatus, the encoding channels in each row comprise M encoding bits, the encoding bit is formed by the recess or the protrusion, the M encoding bits constitute the position encoding information of the encoding channel where they are located, and the position encoding information of the encoding channels in respective rows are different, wherein $1 \leq P \leq 2^M$, and P is a positive integer.

Further, in the row direction, the spacing between two adjacent magnetoresistive sensors in each row is equal to the spacing between two adjacent encoding bits in each row.

Further, the magnetoresistive sensor is a linear magnetoresistive sensor, and the linear magnetoresistive sensor comprises any one of a Hall effect sensor, an anisotropic sensor, a giant magnetoresistive sensor, and a tunnel magnetoresistive sensor.

Further, the magnetoresistive sensor is a gradient magnetoresistive sensor, and the gradient magnetoresistive sensor comprises any one of a Hall effect sensor, an anisotropic sensor, a giant magnetoresistive sensor, and a tunnel magnetoresistive sensor.

Further, the encoding strip is integrally formed with the base.

Further, the encoding form of the encoding strip is binary code or Gray code.

According to the embodiments of the present disclosure, the encoding strip is formed by the magnetic material block having the recess and the protrusion for identifying the encoding information of different positions, the encoding strip is fixed on the base and extends in the direction of the rail of the tested apparatus, the magnetoresistive sensor array is arranged between the encoding strip and the back magnet in a non-contact manner, the back magnet is used for generating a non-uniform magnetic field around the encoding strip, and the magnetoresistive sensor array is used for acquiring position encoding information of the encoding strip by detecting magnetic field information of the encoding strip. In this scheme, the back magnet is used for magnetizing the encoding strip, which achieves the purpose of detecting the displacement of the tested apparatus and greatly reduces the cost of the linear displacement absolute position encoder.

BRIEF DESCRIPTION OF THE DRAWINGS

In order to more clearly illustrate the embodiments of the present disclosure or the technical solutions in the prior art, the accompanying drawings to be used in the description of the embodiments or the prior art will be briefly introduced below. Obviously, the accompanying drawings in the following description are some embodiments of the present disclosure. For those of ordinary skill in the art, other drawings can also be obtained from these drawings without creative efforts.

DETAILED DESCRIPTION

The present disclosure will be further described in detail below in conjunction with the accompanying drawings and embodiments. It can be understood that the specific embodiments described herein are only used to explain the present disclosure, but not to limit the present disclosure. In addition, it should be noted that, for the convenience of description, the drawings only show some but not all structures related to the present disclosure.

Figure 1:
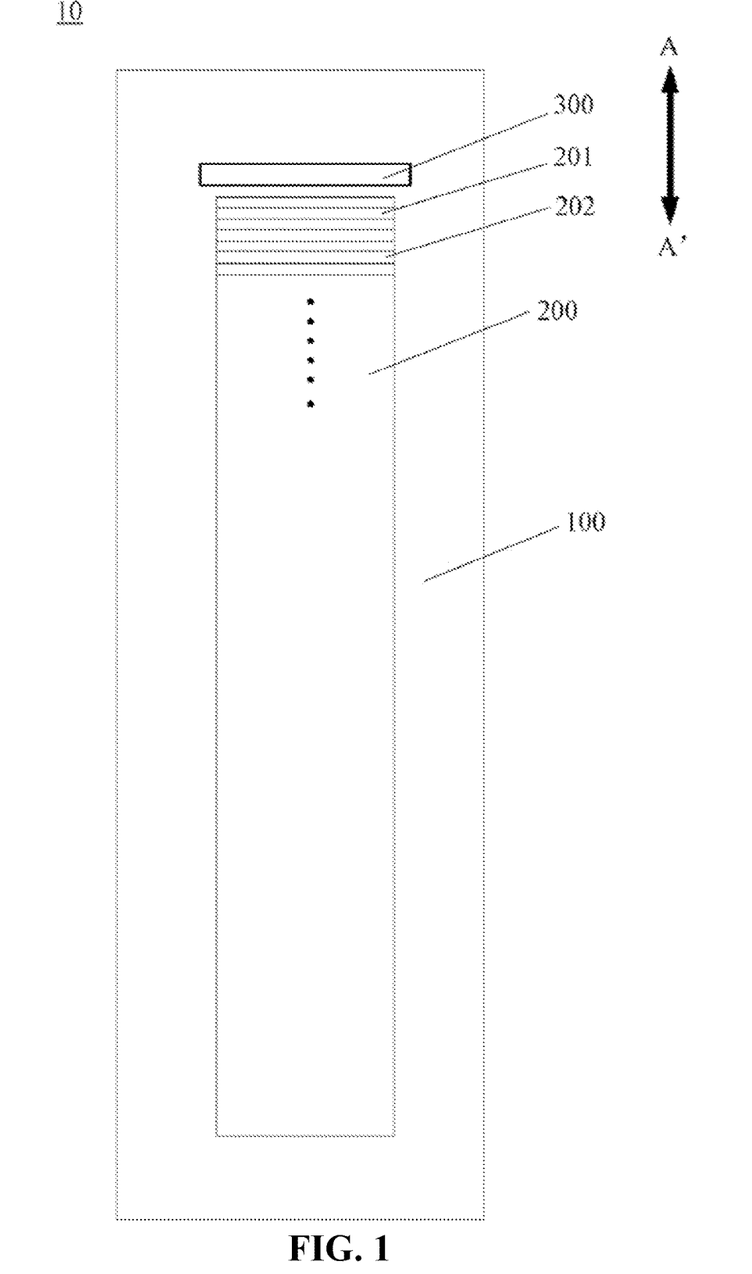
FIG. 1 is a schematic diagram of an overall structure of a linear displacement absolute position encoder provided by an embodiment of the present disclosure.

FIG. 1 is a schematic diagram of an overall structure of a linear displacement absolute position encoder provided by an embodiment of the present disclosure, the linear displacement absolute position encoder 10 can be used for measuring displacement of a tested apparatus, referring to FIG. 1, the linear displacement absolute position encoder 10 comprising a base 100, a magnetoresistive sensor array 300, an encoding strip 200, and a back magnet (not shown), wherein the encoding strip 200 is fixed on the base 100 and extends in the direction AA' of a rail of the tested apparatus, and the encoding strip 200 is a magnetic material block having recesses and a protrusions for identifying encoding information of different positions; the magnetoresistive sensor array 300 is arranged between the encoding strip 200 and the back magnet in a non-contact manner; the back magnet is used for generating a non-uniform magnetic field around the encoding strip 200 so as to magnetize the encoding strip 200; the magnetoresistive sensor array 300 comprises magnetoresistive sensors in N rows and M columns, wherein N≥1, M≥1, and N and M are both positive integers (FIG. 1 does not show the array arrangement structure of the magnetoresistive sensors), and the magnetoresistive sensor array 300 is used for acquiring position encoding information of the encoding strip 200 by detecting magnetic field information of the encoding strip 200.

The general principle of position measurement is as follows: placing an encoding disc representing a position within the whole measuring range, the position of the encoding disc being fixed, and then fixing a sensor on a moving part, so as to detect relative displacement of the moving part.

In the present embodiment, specifically, the encoding strip 200 is made of a magnetic material, different recesses and protrusions are provided at different positions of the encoding strip 200 to form the position encoding information for identifying the different positions. Illustratively, referring to FIG. 1, the position encoding information corresponding to a first position 201 and a second position 202 of the encoding strip 200 can be made different by arranging different recesses and protrusions at the first position 201 and the second position 202. The encoding strip 200 is fixed on the base 100 and extends in the direction of the rail of the tested apparatus, so that different positions in the moving direction of the tested apparatus can be identified by the encoding strip 200.

Illustratively, the magnetoresistive sensor array 300 and the back magnet may be mounted on the tested apparatus such that the magnetoresistive sensor array 300 and the back magnet move as the tested apparatus moves, in the moving process, a magnetic field is formed around the encoding strip 200 by using the back magnet, and the magnetic field distribution on the encoding strip 200 is sensed by using the magnetoresistive sensors in the magnetoresistive sensor array 300. Since the encoding strip 200 has different recesses and protrusions at different positions, the magnetic field distribution at different positions of the encoding strip 200 is different and non-uniform, and the magnetoresistive sensor array 300 can acquire the position encoding information at corresponding positions by detecting the magnetic field distribution at different positions of the encoding strip 200, thereby determining the position of the tested apparatus.

Illustratively, the back magnet may be a permanent magnet, the encoding strip 200 may be made of a soft magnetic material, the cost of a soft magnetic material having recesses and protrusions is lower, and by magnetizing the soft magnetic material with the permanent magnet, the use of long-distance permanent magnet magnetic grids may be avoided, thereby saving costs. In addition, the permanent magnet is not affected by the demagnetization of the magnet, so that the linear displacement absolute position encoder 10 can have a long service life.

It should be noted that FIG. 1 does not show the recess and protrusion structures of the encoding strip 200, and the function thereof is to enable the magnetic field applied by the back magnet on the encoding strip to have different distribution states due to failure to pass through the recess and protrusion structures at different positions, so as to achieve the purpose of identifying different positions, which can be set by a person skilled in the art at will and is not limited by the example of the present disclosure.

It should also be noted that FIG. 1 and subsequent figures do not show the back magnet, it can be understood that in a practical product, the back magnet is arranged opposite to the surface of the encoding strip 200 having the recess and protrusion structures. Accordingly, the magnetoresistive sensor array 300 is also arranged opposite to the surface of the encoding strip 200 having the recess and protrusion structures, and the magnetoresistive sensor array 300 is not in contact with the encoding strip 200; and the position information of the tested apparatus is acquired by sensing the magnetic field distribution around the encoding strip 200.

According to the embodiments of the present disclosure, the encoding strip is formed by a magnetic material block having recesses and protrusions for identifying the encoding information of different positions, the encoding strip is fixed on the base and extends in the direction of the rail of the tested apparatus, the magnetoresistive sensor array is arranged between the encoding strip and the back magnet in a non-contact manner, the back magnet is used for generating a non-uniform magnetic field around the encoding strip, and the magnetoresistive sensor array is used for acquiring position encoding information of the encoding strip by detecting magnetic field information of the encoding strip. In this scheme, the back magnet is used for magnetizing the encoding strip, which achieves the purpose of detecting the displacement of the tested apparatus and greatly reduces the cost of the linear displacement absolute position encoder.

Figure 2:
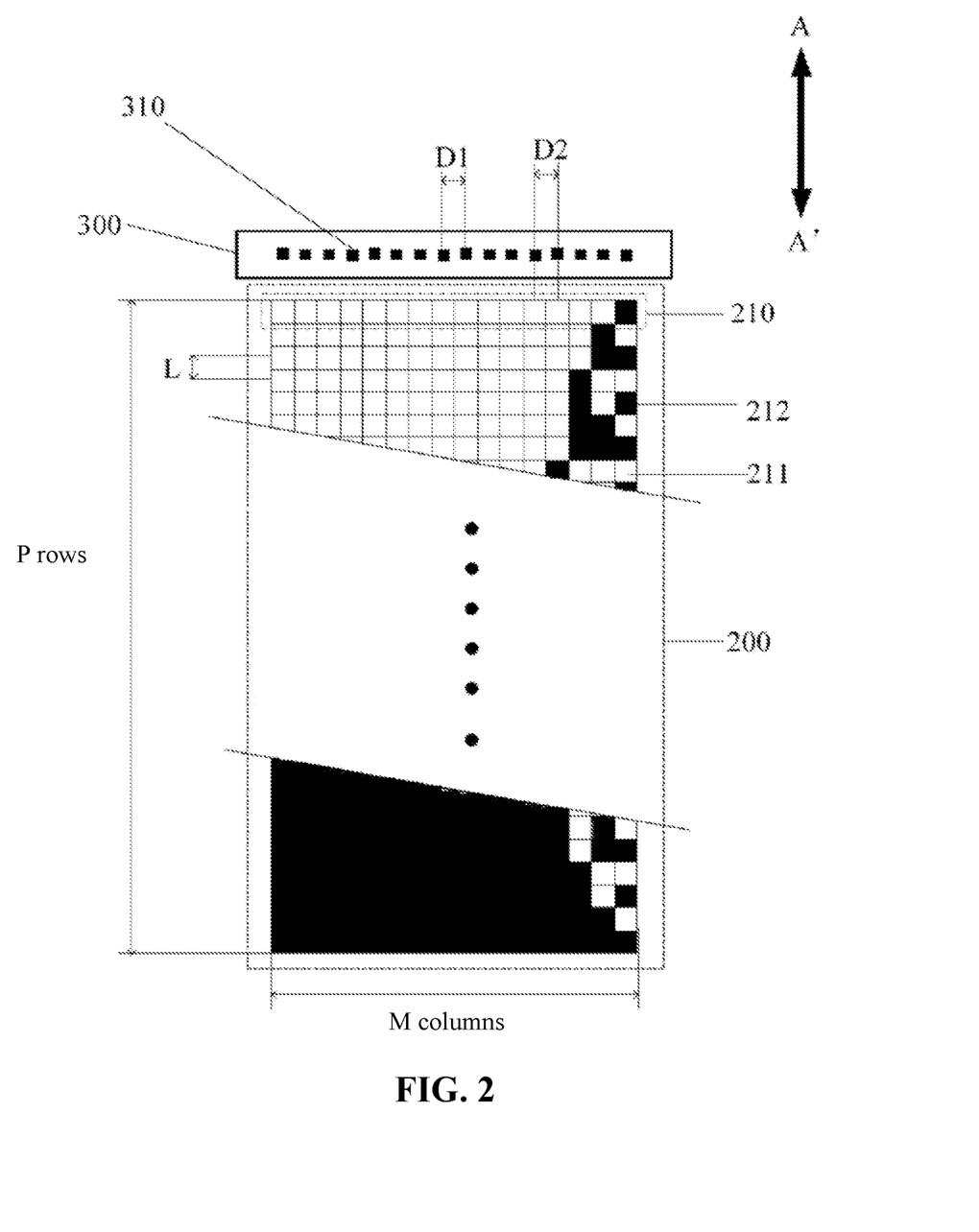
FIG. 2 is a schematic structural diagram of the encoding strip and the magnetoresistive sensor array in FIG. 1.

FIG. 2 is a schematic structural diagram of the encoding strip and the magnetoresistive sensor array in FIG. 1, and the structures of the encoding strip 200 and the magnetoresistive sensor array 300 are further illustrated on the basis of the above embodiment. Referring to FIG. 2, optionally, the encoding strip 200 has P rows of encoding channels 210 arranged in the direction of the rail of the tested apparatus, the encoding channels 210 in each row comprise M encoding bits, the encoding bit is formed by a recess 211 or a protrusion 212, the M encoding bits constitute position encoding information of the encoding channel 210 where they are located, and the position encoding information of the encoding channels 210 in respective rows are different, wherein $1 \leq P < 2^M$, and P is a positive integer.

Illustratively, FIG. 2 shows the encoding bits with square grids and shows M=16, i.e., a structure of the encoding strip 200 with one row of encoding channels 210 comprising 16 encoding bits. Specifically, the encoding bit is formed by the recess 211 or the protrusion 212, and it can be seen from FIG. 2 that the recesses 211 and protrusions 212 of the encoding channel 210 in each row are different; therefore, the position encoding information of the encoding channel 210 in respective rows are different, in other words, the encoding information on each encoding channel 210 is unique, and the encoding strip 200 can identify at least $2^M$ positions.

Due to setting in this way, the encoding channel 210 having recesses 211 and protrusions 212 can be used as a magnetic grid structure to realize two-dimensional distribution of magnetic grids, thereby greatly reducing the size of the magnetic grid.

FIG. 2 schematically illustrates the structure of the magnetoresistive sensor array 300 having magnetoresistive sensors 310 in one row and sixteen columns. By arranging the magnetoresistive sensor array 300 in a row direction with M magnetoresistive sensors 310 corresponding to M encoding bits of one row of encoding channels 210 one to one, it is possible to enable each magnetoresistive sensor 310 to collect the magnetic field strength of the corresponding encoding bit so as to determine the encoding information of each encoding bit, and finally the position encoding information of the encoding channel 210 where the M encoding bits are located is determined through the encoding information of the M encoding bits, so as to determine the position of the tested apparatus.

Continuing to refer to FIG. 2, optionally, in the row direction, the spacing D1 between two adjacent magnetoresistive sensors 310 in each row is equal to the spacing D2 between two adjacent encoding bits in each row.

In the row direction, by setting the spacing D1 between two adjacent magnetoresistive sensors 310 in each row to be equal to the spacing D2 between two adjacent encoding bits in each row, the results when the magnetoresistive sensors 310 detect the magnetic field intensity of the corresponding encoding bits can be more accurate, so as to ensure the accuracy of the position encoding information finally obtained, and ensure that the encoder has excellent performance.

It should be noted that the number M of the encoding bits of the encoding channel 210 in each row may be set by those skilled in the art at will and is not limited by the embodiments of the present disclosure. As shown in FIG. 2, in the direction AA' of the rail, the distance between two adjacent rows of encoding channels 210 is L, and it can be understood that L determines the resolution of the encoder, and the smaller L, the higher the resolution of the encoder. The number of the encoding bits in the encoding channel 210 in each row determines the number of the encoding channels 210; therefore, in order to widen the measurement range, the number of the encoding bits shall be as greater as possible.

Illustratively, taking a high-resolution Tunnel Magneto Resistance (TMR) sensor as an example, the minimum unit size thereof is 0.2 mm, namely, D1=D2=0.2 mm; assuming that the magnetoresistive sensor array 300 is composed of 20 magnetoresistive sensors 310 arranged in the lateral direction, in order to ensure that the position encoding information of the encoding channel 210 in each row is unique, at most $2^{20}$ rows of encoding channels 210 can be arranged; if the spacing L between adjacent encoding channels 210 is 1 mm, then the measurement length is $2^{20} \times 1$ mm=1,048,576 mm, and the measurement resolution is 1 mm; if 30 magnetoresistive sensors 310 are arranged in the lateral direction, at most $2^{30}$ rows of encoding channels 210 can be arranged, and the measurement length can reach 1000 Km. If it is necessary to improve the resolution of the encoder, it is only required to reduce the spacing L.

Figure 3:
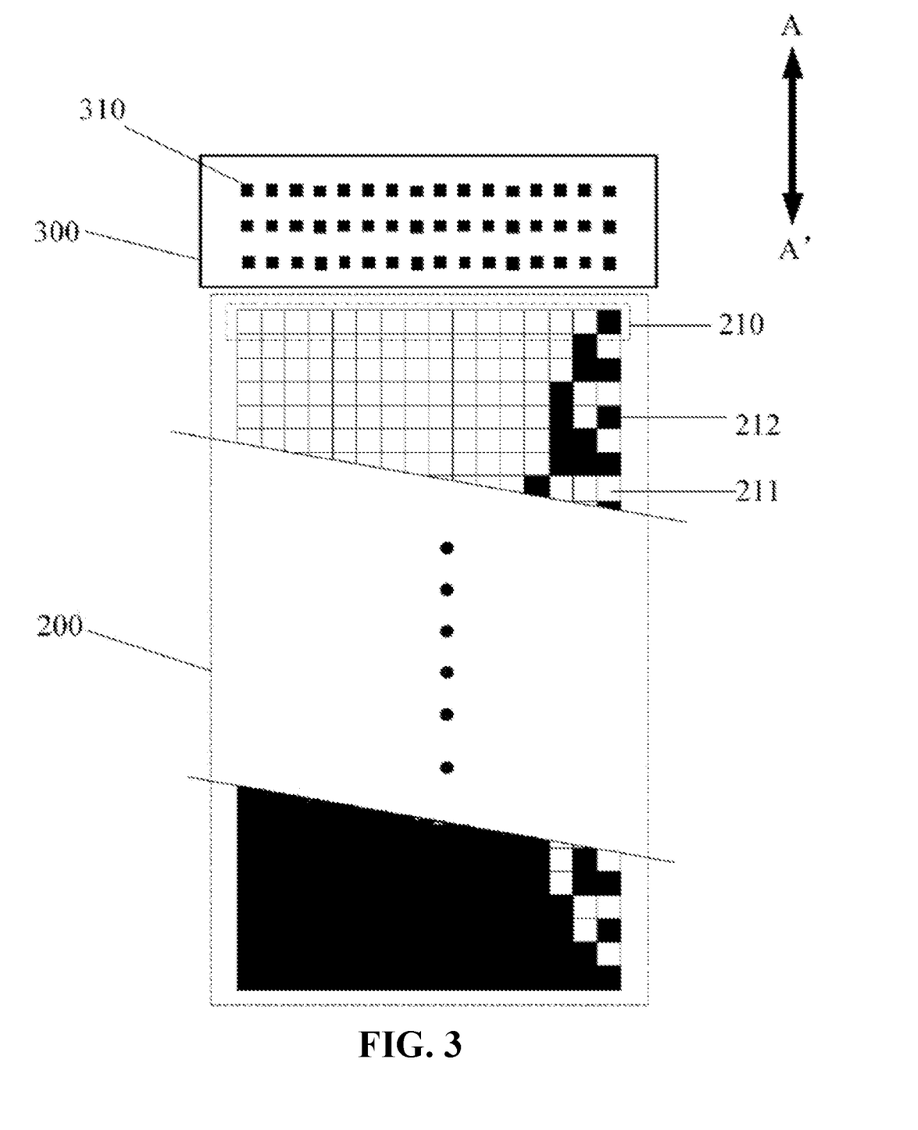
FIG. 3 is another schematic structural diagram of the encoding strip and the magnetoresistive sensor array in FIG. 1.

FIG. 3 is another schematic structural diagram of the encoding strip and the magnetoresistive sensor array in FIG. 1. Illustratively, the magnetoresistive sensor array 300 includes a plurality of (N=3) rows of magnetoresistive sensors 310. By setting in this way, the magnetoresistive sensors 310 can simultaneously acquire the position encoding information of adjacent N rows of encoding channels 210, thereby ensuring the accuracy of the detection result and improving the reliability of the encoder.

Figure 4:
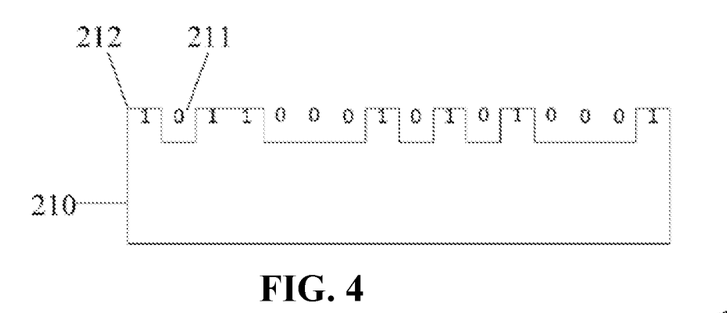
FIG. 4 is a schematic structural diagram of recesses and protrusions of one row of encoding channels in FIG. 2 or FIG. 3.

FIG. 4 is a schematic structural diagram of the recess and the protrusion of one row of encoding channel in FIG. 2 or FIG. 3; referring to FIG. 4, optionally, the encoding form of the encoding strip 200 is binary code or Gray code.

As shown in FIG. 4, the encoding information of the recess 211 and the encoding information of the protrusion 212 in the encoding channel 210 is "0" and "1", and the position encoding information of the encoding channel 210 is uniquely determined by "1011 0001 0101 0001". By using the encoding form of binary code or Gray code, it is possible to make the encoding form simpler without complex cursor calculation. A person skilled in the art can choose to use natural binary code or Gray binary code when encoding the encoding strip. The encoding form of the natural binary code is simple, but errors are easily caused due to the inversion of multiple levels during converting between adjacent numbers. In the Gray binary code, there is conversion of only one level every time a decimal number is changed, which can greatly reduce the noise in the conversion process and improve the accuracy.

Figure 5:
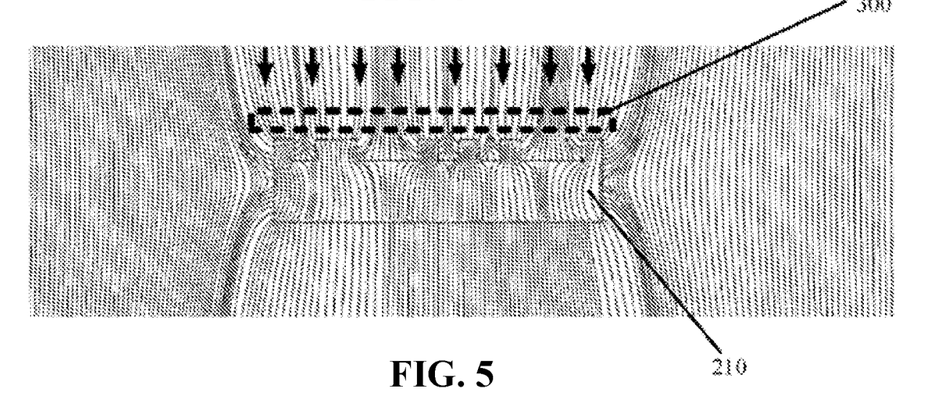
FIG. 5 is a schematic diagram of distribution of magnetic force lines around the encoding channel shown in FIG. 4 under the action of a back magnet.

FIG. 5 is a schematic diagram of distribution of magnetic force lines around the encoding channel shown in FIG. 4 under the action of the back magnet. In FIG. 5, the bold arrows indicate the magnetizing direction in which the back magnet magnetizes the encoding strip 200. When the encoding channel 210 is exposed to the magnetic field generated by the back magnet, the magnetic field is deviated in the vicinity of recesses and protrusions on the surface thereof due to the recesses and protrusions. It can be seen from FIG. 5 that the magnetic force lines at the recesses of the encoding channel 210 are relatively sparse, while the magnetic force lines at the protrusions are relatively dense; the magnetic field intensity of each encoding bit is detected by using the magnetoresistive sensor array 300, and then digital processing is performed to obtain the encoding information of each encoding bit, thereby obtaining the position encoding information of the corresponding encoding channel 210.

Figure 6:
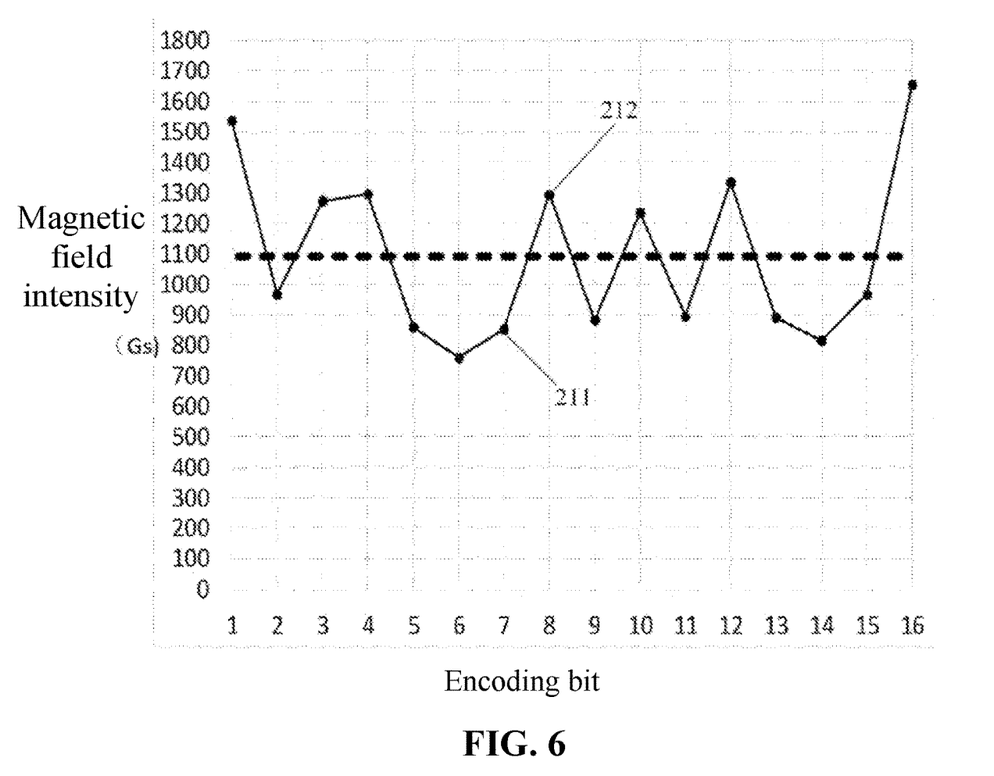
FIG. 6 is a curve graph of magnetic field strength distribution corresponding to the encoding bits in one row of encoding channels corresponding to FIG. 5.

FIG. 6 is a curve graph of magnetic field strength distribution corresponding to each encoding bit in one row of encoding channel corresponding to FIG. 5, which is obtained by using finite element analogue simulation. As can be seen from FIG. 6, the magnetic field strength corresponding to the encoding bit at each recess 211 is smaller, and the magnetic field strength corresponding to the encoding bit at each protrusion 212 is larger. If it is bounded by 1100 Gs (as shown by the dotted line in the figure), the values of the encoding bits 1-16 can be classified, and it is defined that the value smaller than 1100 Gs is "0", the value higher than 1100 Gs is "1", then the position encoding information read out from the curve is "1011 0001 0101 0001", which is consistent with the position encoding information in FIG. 4, thus proving the correctness of the scheme.

Optionally, the magnetoresistive sensor is a linear magnetoresistive sensor, and the linear magnetoresistive sensor comprises any one of a Hall effect sensor, an anisotropic sensor, a giant magnetoresistive sensor, and a tunnel magnetoresistive sensor.

Figure 7:
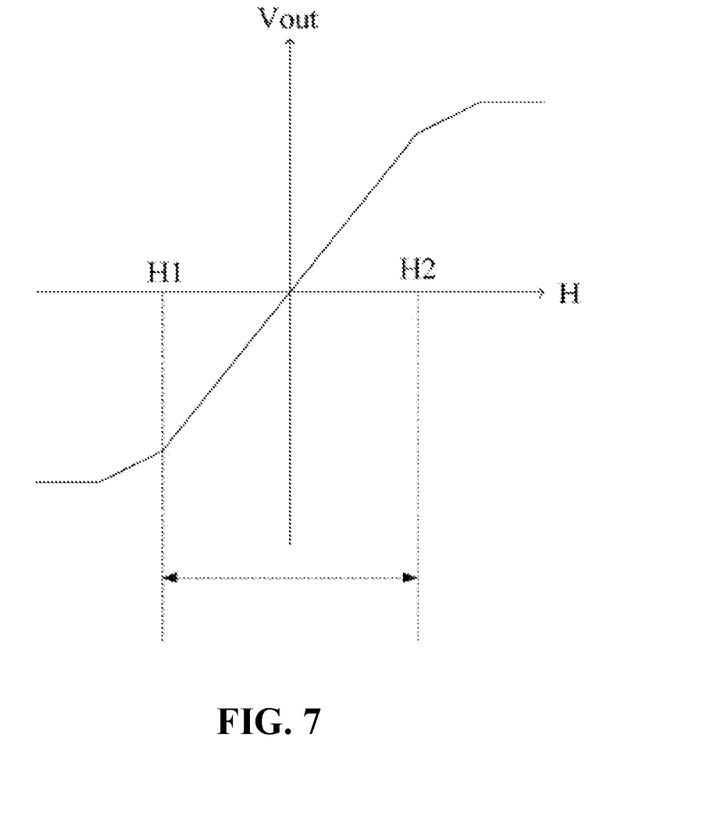
FIG. 7 is a curve graph of characteristics of a magnetoresistive sensor.

FIG. 7 is a curve graph of characteristics of the magnetoresistive sensor, wherein the abscissa H represents the magnetic field strength, and the ordinate Vout represents the output voltage of the magnetic sensor. It can be seen from the characteristic curve that the magnetoresistive sensor can be saturated when the magnetic field strength is high, namely, the output voltage of the magnetoresistive sensor no longer increases with the increase of the external magnetic field. Therefore, when the encoder is used, the magnetic field should be optimized so that the magnetoresistive sensor operates in a linear region H1-H2.

In addition, optionally, the magnetoresistive sensor is a gradient magnetoresistive sensor, and the gradient magnetoresistive sensor comprises any one of a Hall effect sensor, an anisotropic sensor, a giant magnetoresistive sensor, and a tunnel magnetoresistive sensor.

The above-mentioned linear magnetoresistive sensor and gradient magnetoresistive sensor both have a good magnetic induction capability, a person skilled in the art can make a selection at will according to actual needs, and the embodiments of the present disclosure do not define this.

Optionally, the encoding strip 200 is formed integrally with the base 100.

By setting in this way, the cost of the encoder can be further reduced, and the manufacturing process can be simplified.

The embodiments of the present disclosure constitutes the encoding channel of one position by constructing M encoding bits formed by the recess or the protrusion arranged in the lateral direction on a high magnetic conductivity material, and several encoding channels are arranged in the direction of the rail of the high magnetic conductivity material to constitute the encoding strip, then the encoding strip is encoded in the encoding form of binary or Gray code to identify different positions. The back magnet is used for magnetizing the encoding strip, and a non-uniform magnetic field is formed around the encoding strip, and M magnetoresistive sensors are disposed and arranged in the lateral direction so as to correspond to the encoding bits one to one and form the magnetoresistive sensor array for reading the position encoding information of the corresponding encoding channel Since the encoding channel of each position has the unique position encoding information, the magnetic sensor array can be used to obtain the position encoding information of different positions of the tested apparatus in the moving process and realize the measurement of the absolute position of its linear displacement. The linear displacement absolute position encoder has the advantages of low cost, small size, simple encoding mode, long service life, pollution resistance, vibration resistance, etc. and has very good practicability.

It should be noted that what is described above is only preferred embodiments of the present disclosure and the technical principles employed. It will be understood by those skilled in the art that the present disclosure is not limited to the particular embodiments described herein, and that various obvious changes, rearrangements, and substitutions can be made by those skilled in the art without departing from the protection scope of the present disclosure. Therefore, although the present disclosure has been described in detail through the above embodiments, the present disclosure is not limited to the above embodiments only, but can include more other equivalent embodiments without departing from the concept of the present disclosure, and the scope of the present disclosure is determined by the appended claims.

The invention claimed is:

1. A linear displacement absolute position encoder used for measuring displacement in a direction of a rail of a tested apparatus, the linear displacement absolute position encoder comprising:
    a base,
    a magnetoresistive sensor array,
    an encoding strip, and
    a back magnet;
    wherein the encoding strip is fixed on the base and extends in the direction of the rail of the tested apparatus, the encoding strip includes a magnetic material block having recesses and protrusions corresponding to an array of encoding bits used to encode different positions, the array of encoding bits in the encoding strip includes P rows where P is an integer more than one and M columns where M is an integer more than one, each of the encoding bits having a value set based on a corresponding recess or protrusion in the magnetic material block, each of the P rows forming an encoding channel with M encoding bits corresponding to a unique pattern of recesses and protrusions to uniquely encode position information;
    wherein the back magnet is configured to generate a non-uniform magnetic field around the encoding strip to magnetize the encoding strip; and
    wherein the magnetoresistive sensor array is arranged between the encoding strip and the back magnet in a non-contact manner, the magnetoresistive sensor array includes magnetoresistive sensors in N rows where N is a positive integer and M columns, and the magnetoresistive sensor array is configured to be used to determine the position information using the M encoding bits for at least one of the P rows.

2. The linear displacement absolute position encoder according to claim 1, wherein $1 \leq P \leq 2^M$.

3. The linear displacement absolute position encoder according to claim 1, wherein in a direction of the rows, spacing between two adjacent magnetoresistive sensors in each of the N rows is equal to spacing between two adjacent encoding bits in each of the P rows in the array of encoding bits.

4. The linear displacement absolute position encoder according to claim 1, wherein the magnetoresistive sensor is a linear magnetoresistive sensor, and the linear magnetoresistive sensor comprises any one of an anisotropic sensor, a giant magnetoresistive sensor, and a tunnel magnetoresistive sensor.

5. The linear displacement absolute position encoder according to claim 1, wherein the magnetoresistive sensor is a gradient magnetoresistive sensor, and the gradient magnetoresistive sensor comprises any one of an anisotropic sensor, a giant magnetoresistive sensor, and a tunnel magnetoresistive sensor.

6. The linear displacement absolute position encoder according to claim 1, wherein the encoding strip is integrally formed with the base.

7. The linear displacement absolute position encoder according to claim 1, wherein the encoding strip uses a binary code in the M encoding bits to uniquely identify each of the P rows.

8. The linear displacement absolute position encoder according to claim 1, wherein the encoding strip uses a Gray code in the M encoding bits to uniquely identify each of the P rows.

9. The linear displacement absolute position encoder according to claim 1, wherein the unique pattern of recesses and protrusions includes one of a "0" or "1" for each of the encoding bits corresponding to the recesses an includes the other of the "0" or "1" for each of the encoding bits corresponding to the protrusions.

10. The linear displacement absolute position encoder according to claim 1, wherein the magnetoresistive sensor array includes an array of high-resolution Tunnel Magneto Resistance (TMR) sensors.

11. The linear displacement absolute position encoder according to claim 1, wherein the magnetoresistive sensor array is configured to be used to simultaneously determine the position information using the M encoding bits for more than one of the P rows to improve reliability.

12. The linear displacement absolute position encoder according to claim 11, wherein the magnetoresistive sensor array includes magnetoresistive sensors in three rows to simultaneously determine the position information using the M encoding bits for more than one of the P rows to improve reliability.

13. The linear displacement absolute position encoder according to claim 1, wherein the magnetoresistive sensor array includes one row (N=1) of magnetoresistive sensors.

14. The linear displacement absolute position encoder according to claim 1, wherein each magnetoresistive sensor in at least one of the N rows of the magnetoresistive sensor array is used to detect a magnetic field intensity of a corresponding encoding bit in one of the P rows or the array of encoding bits, and the magnetic field intensity for the protrusions is stronger than the magnetic field intensity for the recesses.

15. The linear displacement absolute position encoder according to claim 14, wherein an output of each magnetoresistive sensor is digital processed into a digital value for the corresponding encoding bit.

16. The linear displacement absolute position encoder according to claim 1, wherein the array of encoding bits in the encoding strip is configured with equal row-to-row spacing and with equal column-to-column spacing, and the row-to-row spacing equals the column-to-column spacing.

* * * * *